Figure 1:
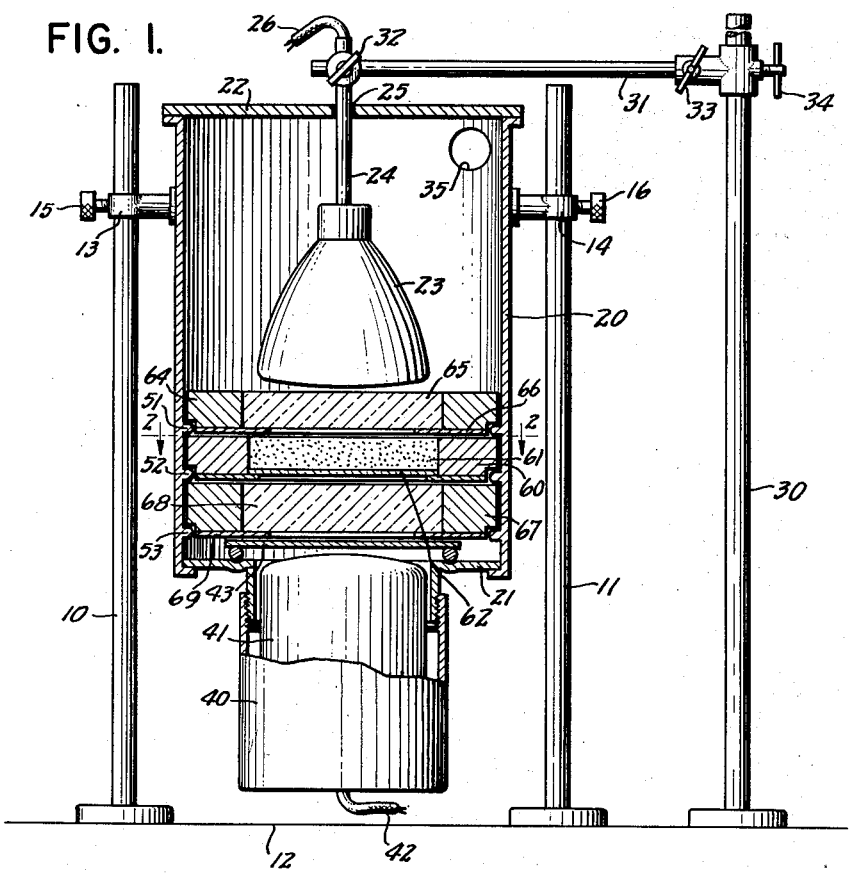

Dec. 22, 1953

M. SLAVIN ET AL 2,663,801

TRANSMISSION FLUORIMETER

Filed Oct. 8, 1951

Inventor
MORRIS SLAVIN
MARY H. FLETCHER
IRVING MAY

By Roland A. Anderson
Attorney

Patented Dec. 22, 1953

2,663,801

UNITED STATES PATENT OFFICE 2,663,801

TRANSMISSION FLUORIMETER

Morris Slavin, East Setauket, N. Y., Mary H. Fletcher, Alexandria, Va., and Irving May, Washington, D. C., assignors to the United States of America as represented by the United States Atomic Energy Commission Application October 8, 1951, Serial No. 250,218

3 Claims. (Cl. 250—77)

This invention relates to the art of analyzing materials by measuring the fluorescence emitted therefrom when subjected to ultraviolet light and more particularly, relates to a new and improved fluorimeter apparatus. In the conventional arrangement of fluorimeter apparatus it has been the general practice both to irradiate and to observe the fluorescence of a sample of material under analysis from the same side of the comparatively thick sample and the optical system thus employed has involved the use of a comparatively large housing and relatively inefficient use of light energy. In some cases fluorimeters have also been employed in which the emitted fluorescent light from a transverse section of a sample is directed to a measuring means located substantially normally to the direction of the ultraviolet light with the result that the same disadvantages found in the so-called "reflection" arrangement are found to be present. Among these disadvantages are the optical limitations imposed by the relatively small solid angle viewed by the fluorescent light measuring means and the fact that a considerable amount of the fluorescent light generated in the sample under analysis is in fact absorbed within such sample without ever reaching such measuring means.

In contrast thereto the present invention utilizes the direct transmission of ultraviolet light through a comparatively thin sample of material and the measuring of the emitted fluorescent light at a relatively large solid angle along the extended axis of the impinging ultraviolet light. Accordingly, it is an object of our invention to provide a new and improved fluorimeter having its conventional structural elements arranged in a new and useful combination permitting the transmission of a portion of the ultraviolet light through a sample having a thickness which may be established to give both an optimum value for absorption of ultraviolet light and an optimum value for transmtting the generated fluorescent light.

A second object is to provide a fluorimeter arrangement wherein the distance from the ultraviolet source to the fluorescent light measuring means is substantially reduced to a minimum.

A third object is to provide a compact, inexpensive fluorimeter structure having efficient light-shielding and adapted to employ ultraviolet light sources of comparatively small output. Another object is to provide a transmission fluorimeter having a comparatively high sensitivity of measurement and subjected to a minimum of stray fluorescent light interference.

Figures 2, 3:
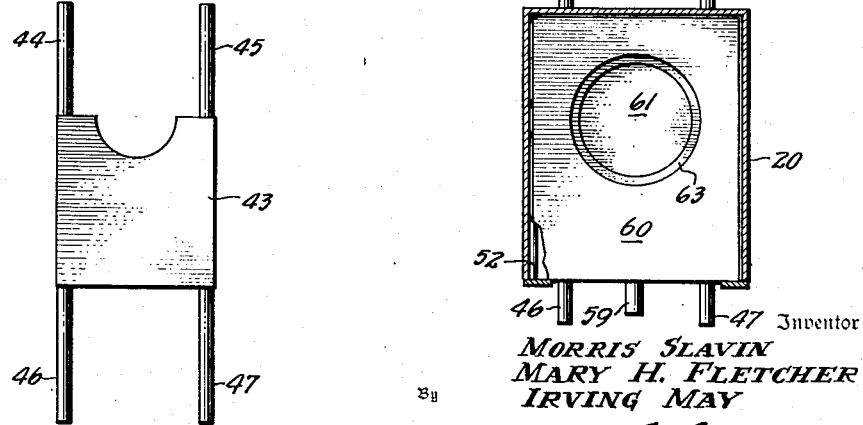

Other objects and advantages will become more apparent when considered in conjunction with the following description and the accompanying drawings in which Figure 1 is a view partly in section taken along a vertical center line of a suitable rectangular-shaped fluorimeter housing;

Figure 2 is a view taken on line 2—2 of Figure 1 and showing the top surface of a sample holder; and Figure 3 is a top plan view of a shutter device.

Referring now to Figure 1 there is shown a transmission fluorimeter capable of carrying out the invention and characterized by simplicity of construction. For convenience, certain structural elements such as the filter and sample holders are shown to a greatly enlarged scale and conventional details of light sealing, such as painted or covered surfaces and close fitting machined elements, all of which are known to those skilled in the art, have been omitted from the drawing. As shown, a plurality of vertical support rods such as 10 and 11 are mounted upon a supporting surface generally indicated at 12. Brackets 13 and 14 extending outwardly from a fluorimeter housing engage the respective rods and by means of adjustable fastening means 15 and 16 permit the fluorimeter assembly to be positioned at the desired vertical distance from the supporting surface.

A suitable housing 20 constructed of wood, metal or other material and interiorly coated with a light-absorbing surface, such as for example a flat black paint, graphite or other material which will reduce stray fluorescence is provided with an apertured bottom plate 21 serving as a threaded terminal portion later to be described. The housing, herein shown as being rectangular in section, is likewise provided with a removable cover plate 22 and with rear, front and side walls, all cooperating to form within the upper portion of the housing an enclosed compartment for a light source. Adjustably mounted within this compartment is an ultraviolet lamp 23 suspended from a tube 24 adapted to pass through a small aperture 25 in the cover plate and to be suitably sealed therein in any appropriate manner (not shown) so as to exclude light leakage through said aperture.

Electrical connection to said lamp may be made by means of a lead 26 passing through said tube support. By means of a vertical support rod 30 and a cantilever horizontal support rod 31, the light may be adjustably supported at a desired height within the housing which in turn may be supported from rods 10 and 11 at a desired height above the supporting surface 12. Suitable detachable clamps 32, 33 and 34 may be provided for assembly and disassembly of the thus described structure.

For the purpose of removing heat, as by air circulation, an aperture 35 may conveniently be provided in a rear wall of housing 20, it being understood that suitable light baffles and absorbers will be provided in such vent in order to eliminate the ingress of stray light into the enclosed light source compartment.

Adjacent the apertured bottom plate 21 a housing 40 containing a light responsive means 41 having an external electrical connection 42 is mounted, as by a threaded fit with the threaded terminal collar of said plate. Housing 40 is provided with an aperture corresponding to the aperture in the bottom plate and both apertures are aligned in prolongation with the path of light rays emitted from lamp 23.

In the front and rear walls of the housing, suitable guide rod apertures, light sealed in any suitable manner not shown, are provided for a shutter means 43, best shown in Figure 3, which is adapted to be shuttled back and forth as desired, as by means of manipulation externally of the housing, thereby to open or close said light apertures to light passing from the interior of housing 20 to said light responsive means 41. For purposes of manipulating and guiding the shutter which preferably is permanently mounted in the housing, a plurality of externally projecting guide rods 44, 45, 46 and 47 may be provided.

With the above general combination of structure in mind, reference now is made to Figure 1 wherein a compact assembly conveniently termed the fluorescent-light-producing packet, is shown removably mounted within the housing 20, as upon parallel guide and light shielding ledges 51, 52 and 53 built into the side walls of said housing. As noted from Figure 2, the front wall of the housing is provided with an aperture into which this assembly may be inserted and preferably the rear wall of the housing is closed since the packet may be inserted and removed from the single aperture in one wall only.

The packet preferably includes a centrally disposed sample holder 60 having a central aperture into which the sample 61 may be placed and retained if necessary as by means of a non-fluorescing sheet 62 resting upon the integral ledge 63 of such holder. By means of a handle 59 the sample holder 60 may be moved into and out of the housing as desired. The sheet 62 may comprise a thin glass ring, a disc cut from a photographic plate or other suitable non-fluorescing material and serves to prevent any flakes from the sample 61 from falling into the lower part of the apparatus. On the side nearer lamp 23 and closely abutting the top surface of holder 60 is an apertured first filter holder 64 adapted to support a filter 65 resting upon an integral ledge 66 of this holder. On the side nearer shutter 43 and closely abutting the lower surface of holder 60 is an apertured second filter holder 67 adapted to support a filter 68 resting upon an integral ledge 69 of this holder.

The above three cooperating packet elements may if desired be inserted and removed seriatim and independently from housing 20 or may be fastened together as a single unit for insertion or removal as a single structure, as by means of the sample holder handle 59. By means of the thus described structure, the advantages of the transmission fluorimeter may now be seen in better perspective. For example, whereas comparatively thick but translucent samples of material have heretofore been analyzed by fluorimetric techniques, we now find it feasible to employ a thin solid sample 61 having thicknesses ranging in the order of from 0.017 to 0.070 inch. One such sample, for illustration, can comprise a solidified melt consisting of a mixture of alkali carbonate-fluoride flux containing the mixture whose fluorescence is to be measured in order to determine the content of a specified ingredient such as uranium. However, in its broader aspects the invention is not limited to a solid sample, but on the contrary may employ liquid or even gaseous samples enclosed in suitable holders. By using in the packet a filter 65 as for example of a Corning No. 5874 glass permeable to the ultra-violet light of a G. E. CH-4 or EH-4 lamp 23 and by using a complementary filter 68 as for example a Baird interference filter peaked to 5590Å±50Å, it has been found that not more than 5% of the ultra-violet light reaches the filter 68 and substantially none of the ultraviolet light passes filter 68. Moreover, due to the use of conventional precautions for guarding against stray fluorescence, any such fluorescence originating in the upper part of housing 20 has equal difficulty in reaching that filter, particularly when the several structural ledges supporting the holders and filters are properly designed. Accordingly, the filter 68 which is permeable to fluorescent light, but not permeable to ultraviolet light, thus has no difficulty in passing only the fluorescent light originating in sample 61. A suitable measuring means 41 for the light passing through filter 68 may comprise the RCA 5819 photomultiplier tube or the photovolt electronic photometer model 512.

Furthermore, as a result of the compact packet assembly the distance from the surface of lamp 23 to the surface of means 41 may be as small as two or three inches and the solid angle viewed by light responsive means 41 from a fluorescing atom located anywhere in the effective portion of the thin sample 61 is relatively large, thus contributing to the sensitivity of the fluorimeter. Hence, since the required light intensity of the lamp 23, as measured by the well known inverse square ratio, may be kept at the desired value with a comparatively low voltage and current, a concomitant savings in heat loss is effected. Moreover, use of such a low voltage lamp now makes possible the use of battery-operated equipment in lieu of the more conventional 110 volt A. C. supply.

As one significant feature of the arrangement employing the compact packet of a thin sample and closely spaced filters, it follows that the ultraviolet light intensity required to cause adequate fluorescence in the thin sample, is much less than required when a distant light, a lens system and a distant measuring means are used. Since the required intensity is thus reduced the lower filter 68 which receives only about 5% of the ultraviolet light incident upon the top of sample 61 thus has no difficulty in filtering out this small amount of light emitted at lamp 23 with that reduced intensity. Various changes in construction of the fluorimeter housing and the light-producing packet may be made without departing from the scope of the invention and it is not desired to limit the invention to the details as shown except insofar as defined by the appended claims.

We claim:

1. A transmission fluorimeter of the class described comprising a light-tight housing, an ultraviolet light source totally enclosed within said housing adjacent one extremity thereof, a light-tight enclosure removably attached to said housing adjacent a second extremity thereof, a fluorescent-light-producing packet mounted within said housing intermediate said source and said enclosure and intercepting all light passing from said source to said enclosure, means adjustably positioning said light source closely adjacent one surface of said packet, said packet including a centrally apertured sample holder interposed between complementary filter holders containing respectively, a first filter permeable to ultraviolet light and a second filter permeable to fluorescent light, said first filter at all times being nearer said light source, a non-fluorescing, fluorescent-light-permeable, sheet member covering the aperture in said sample holder and adapted to support the sample through which the partially filtered light is passed, and a phototube disposed in said enclosure and adapted to measure the fluorescent light originating in the sample held in the sample holder and transmitted through said second filter.

2. Apparatus as defined in claim 1, wherein the plane of the surfaces of the packet elements is substantially normal to the path of the light rays from the light source.

3. Apparatus as defined in claim 1, wherein said sample holder is adapted to hold a thin sample of material having a thickness of between 0.017 and 0.070 inch.

MORRIS SLAVIN.
MARY H. FLETCHER.
IRVING MAY.

References Cited in the file of this patent

UNITED STATES PATENTS

| Number | Name | Date |
|---|---|---|
| 1,768,635 | Schaffner | July 1, 1930 |
| 2,200,853 | Porter et al. | May 14, 1940 |
| 2,381,414 | Wilkie | Aug. 7, 1945 |
| 2,551,542 | Marsh et al. | May 1, 1951 |